United States Patent [19]

Oleck et al.

[11] 4,437,976
[45] Mar. 20, 1984

[54] TWO-STAGE HYDROCARBON DEWAXING HYDROTREATING PROCESS

[75] Inventors: Stephen M. Oleck, Moorestown; Robert C. Wilson, Jr., Woodbury, both of N.J.

[73] Assignee: Mobil Oil Corporation, New York, N.Y.

[21] Appl. No.: 417,765

[22] Filed: Sep. 13, 1982

Related U.S. Application Data

[62] Division of Ser. No. 290,759, Aug. 7, 1981.

[51] Int. Cl.$^3$ .................... C10G 65/02; C10G 45/12
[52] U.S. Cl. ................................ 208/97; 208/216 R
[58] Field of Search .......................... 208/97, 216 R

[56] References Cited

U.S. PATENT DOCUMENTS

| | | | |
|---|---|---|---|
| 3,438,887 | 4/1969 | Morris et al. | 208/87 |
| 3,647,678 | 3/1972 | Egan | 208/59 |
| 3,764,516 | 10/1973 | Steinmetz et al. | 208/27 |
| 3,801,495 | 4/1974 | Gould | 208/97 |
| 3,894,938 | 7/1975 | Gorring et al. | 208/97 |
| 4,292,166 | 9/1981 | Gorring et al. | 208/59 |
| 4,313,817 | 2/1982 | Mayer et al. | 208/89 |

*Primary Examiner*—Delbert E. Gantz
*Assistant Examiner*—O. Chaudhuri
*Attorney, Agent, or Firm*—Alexander J. McKillop; Michael G. Gilman; Van D. Harrison, Jr.

[57] ABSTRACT

The pour point of a hydrocarbon charge stock boiling in the range of 400° F. to 1050° F., and particularly a lubricating oil charge stock boiling between 600° F. and 1050° F. is reduced by catalytically dewaxing the charge stock in the presence of a zeolite catalyst and subsequently subjecting at least the liquid portion thereof to hydrotreating in the presence of a hydrotreating catalyst comprising a hydrogenating component and a siliceous porous crystalline material from the class of ZSM-5, ZSM-11, ZSM-23 and ZSM-35 zeolites.

10 Claims, No Drawings

TWO-STAGE HYDROCARBON DEWAXING HYDROTREATING PROCESS

This is a division of copending application Ser. No. 290,759 filed Aug. 7, 1981.

NATURE OF THE INVENTION

This invention is concerned with the manufacture of high-quality lubricating oils and in particular is concerned with the catalytic dewaxing and hydrotreating of waxy distillate lubricating oils.

PRIOR ART

The refining of petroleum crude oils to obtain lubricant-stocks is based primarily on a series of steps including distillation, solvent refining and dewaxing.

For the preparation of a high grade distillate lubricating oil stock, the current practice is to vacuum distill an atmospheric tower residuum from an appropriate crude oil as the first step. This step provides one or more raw stocks within the boiling range of about 450° to 1050° F. After preparation of a raw stock of suitable boiling range, it is extracted with a solvent, e.g., furfural, phenol, sulfalane, or chlorex, which is selective for aromatic hydrocarbons, and which removes undesirable components. The raffinate from solvent refining is then dewaxed, for example, by admixing with a solvent such as a blend of methyl ethyl ketone and toluene. The mixture is chilled to induce crystallization of the paraffin waxes which are then separated from the raffinate. Sufficient quantities of wax are removed to provide the desired pour point for the raffinate.

Other processes such as hydrofinishing or clay percolation may be used if needed to reduce the nitrogen and sulfur content or improve the color of the lubricating oil stock.

Viscosity index (V.I.) is a quality parameter of considerable importance for distillate lubricating oils to be used in automotive engines and aircraft engines which are subject to wide variations in temperature. This index indicates the degree of change of viscosity with temperature. A high viscosity index of 100 indicates an oil that does not tend to become viscous at low temperature or become thin at high temperatures. Measurement of the Saybolt Universal Viscosity of an oil at 100° and 210° F., and referral to correlations, provides a measure of the V.I. of the oil. For purposes of the present invention, whenever V.I. is referred to it is meant the V.I. as noted in the Viscosity Index tabulations of the ASTM (D567), published by ASTM, 1916 Race Street, Philadelphia, PA, or equivalent.

To prepare high V.I. automotive and aircraft oils the refiner usually selects a crude oil relatively rich in paraffinic hydrocarbons, since experience has shown that crudes poor in paraffins, such as those commonly termed "naphthene-base" crudes yield little or no refined stock having a V.I. above about 40. Suitable stocks for high V.I. oils, however, also contain substantial quantities of waxes which result in solvent-refined lubricating oil stocks of high pour point. Thus, in general, the refining of crude oil to prepare acceptable high V.I. distillate stocks ordinarily includes dewaxing to reduce the pour point.

In recent years catalytic, techniques have become available for dewaxing petroleum stocks. Although some attention has been directed to treating gas oils and manufacturing specialty oils primary interest has been and is the catalytic dewaxing and subsequent treatment of lube oil stocks. Processes relating to the dewaxing of gas oils and specialty oils are described in U.S. Pat. Nos. 3,894,938 and 4,137,148.

U.S. Pat. No. 3,894,938 discloses a catalytic dewaxing process in which high-pour-point, high-sulfur gas oils having a boiling range of about 400° F. to 900° F. are first contacted, in the presence or absence of added hydrogen, with a ZSM-5 type zeolite hydrodewaxing catalyst which may contain a hydrogenation/dehydrogenation component. The effluent therefrom is subsequently desulfurized and denitrogenated by contacting it with a cobalt-molybdenum-alumina catalyst.

U.S. Pat. No. 4,137,148 discloses a process wherein specialty oils of low pour point and excellent stability are produced from waxy crude distillates having a boiling range of 450° F. to 1050° F. by solvent refining, catalytic dewaxing over a zeolite catalyst such as ZSM-5, and hydrotreating. The catalytic dewaxing reaction produces olefins which would impair properties of the dewaxed oil product if retained. These are saturated by hydrogenation in the hydrotreater, as confirmed by chemical analysis of the hydrotreated product for bromine number. Low bromine numbers are an indication of a satisfactory level of saturation. The hydrotreating step constitutes cascading effluent from the catalytic dewaxing step into a hydrotreating reactor of the type now generally employed for the finishing of lubricating oil stocks. Any of the known hydrotreating catalysts consisting of a hydrogenation component on a non-acidic support can be employed, for example, cobalt-molybdate or nickel-molybdate or molybdenum oxide, on an alumina support. Subsequent to this treatment, the effluent of the hydrotreater is topped by distillation to meet flash and firepoint specifications.

Techniques for dewaxing and subsequent treating of lubricating oil stocks are exemplified in U.S. Pat. Nos. 3,755,138 and 4,222,855.

U.S. Pat. No. 3,755,138 discloses a process wherein a lube oil stock boiling between 650° F. and 1100° F. is subjected to mild solvent dewaxing and subsequently to hydrodewaxing. The hydrodewaxing step constitutes contacting the lube oil stock with a crystalline aluminosilicate of the ZSM-5 type which contains a metal hydrogenating component in the presence of added hydrogen. In U.S. Pat. No. 4,222,855 lube oil stocks boiling between 600° F. and 1050° F. are catalytically dewaxed by contacting them with a crystalline aluminosilicate having particularly characterized pore openings such as ZSM-23 and ZSM-35.

U.S. Pat. No. 3,668,113 discloses a process in which petroleum fractions such as gas oil and wax distillate fractions are first passed over a catalyst comprising a crystalline mordenite of reduced alkali metal content and a metal hydrogenating component to remove wax. The reaction product is then passed over a catalyst comprising a refractory inorganic oxide support and a hydrogenating component selected from metals and compounds thereof of Groups VI and VIII of the Periodic Table to remove sulfur.

SUMMARY OF THE INVENTION

We have now discovered that the aforedescribed processes which incorporate a hydrotreating step subsequent to at least partial catalytic-dewaxing are improved in the hydrotreating step by including in the hydrotreating catalyst a minor amount of a siliceous porous crystalline material from the class of ZSM-5, ZSM-11, ZSM-23, and ZSM-35 zeolites.

Although the process of this invention is subsequently described as it applies to the catalytic dewaxing and hydro-treating of lube oil stocks the process is applicable to treating other charge stocks containing petroleum wax such as gas oil fractions boiling between 400° F. and 1000° F.

Accordingly, in brief this invention constitutes the process of reducing the pour point of a hydrocarbon charge stock boiling in the range of 400° F. to 1050° F., and particularly a lubricating oil charge stock boiling between 600° F. and 1050° F. by catalytically dewaxing such charge in the presence of a zeolite catalyst and subsequently subjecting at least the liquid portion thereof to hydrotreating in the presence of a hydrotreating catalyst and a siliceous porous crystalline material from the class of ZSM-5, ZSM-11, ZSM-23 and ZSM-35 zeolites.

DESCRIPTION OF THE INVENTION

As indicated previously this invention is concerned with a catalytic dewaxing and improved hydrotreating operation which results in the production of a lubricating oil having an enhanced V.I. at a given pour point. It should be recognized that there are certain values of pour point which lubricating oils must possess to be commercially useful. Although there is a certain amount of flexibility concerning pour point specification, nevertheless, target pour points for products differ depending on whether heavy or light neutral stock or bright stock is being produced. In general, it is necessary that the pour point of a heavy neutral stock be no higher than about 20° F. and the pour point of a light neutral stock be no higher than about 5° F. The expression "heavy neutral" is intended to include a product typically having the following properties:

|  | Charge | Product |
|---|---|---|
| API Gravity | 29.2 | 27.8 |
| Pour Point, °F. | 105 | 20 |
| Viscosity, CS |  |  |
| Kv at 100° F. | 81.9 | 108.4 |
| Kv at 210° F. | 9.95 | 10.99 |
| Boiling Range (IBP-95%), °F. | 632-970 | 669-983 |

The expression "light neutral" is intended to include a product typically having the following properties:

|  | Charge | Product |
|---|---|---|
| API Gravity | 32.1 | 29.6 |
| Pour Point, °F. | 95 | 5 |
| Viscosity, CS |  |  |
| Kv at 100° F. | — | 37.84 |
| Kv at 130° F. | 14.28 | — |
| Kv at 210° F. | 4.47 | 5.64 |
| Boiling Range (IBP-95%), °F. | 687-847 | 716-844 |

The charge stock used in the process of the invention thus includes petroleum oils boiling within the aforenoted range as well as other processed oils. The boiling points referred to are boiling points at atmospheric pressure and may be determined by vacuum assay in the manner known to those skilled in the art.

In a preferred embodiment of this invention a viscous distillate fraction of crude petroleum oil, isolated by vacuum distillation of a reduced crude from atmopsheric distillation, is solvent refined by countercurrent extraction with at least an equal volume (100 vol. %) of a selective solvent such as furfural. It is preferred to use 1.5 to 2.5 volumes of solvent per volume of oil. The raffinate is subjected to catalytic dewaxing by mixing with hydrogen and contacting it at about 500° to about 675° F. with a catalyst which can be of the ZSM-5 type and can have incorporated therein a hydrogen transfer functional component such as nickel, palladium or platinum.

In some instances, it may be desirable to partially dewax the solvent-refined stock by conventional solvent dewaxing techniques prior to catalytic dewaxing. The higher melting point waxes so removed are those of greater hardness and higher market value than the waxes removed in taking the product to a still lower pour point.

In gas oil dewaxing, the dewaxing step is operated at a temperature of about 300°-1000° F., a pressure of 0-2000 psig, and an LHSV of 0.1 to 10 with a hydrogen to hydrocarbon ratio of about 0 to 25:1. This catalytic dewaxing phase of the overall operation is described in U.S. Pat. No. 3,894,938 which is incorporated herein by reference.

In lube stock dewaxing, conditions for the hydrodewaxing step include a temperature between about 500° and about 675° F., a pressure between about 100 and about 3000 psig and preferably between about 200 and about 1000 psig. The liquid hourly space velocity is generally between about 0.1 and about 10 and preferably between about 0.5 and about 4 and the hydrogen to feedstock ratio is generally between about 400 and about 8000 and preferably between about 800 and 4000 standard cubic feet (scf) of hydrogen per barrel of feed. The catalytic dewaxing step of this invention may be conducted by contacting the feed to be dewaxed with a fixed stationary bed of catalyst, or with a transport bed, as desired. A simple and therefore preferred configuration is a trickle-bed operation in which the feed is allowed to trickle through a stationary fixed bed, preferably in the presence of hydrogen. The dewaxing operation usually is initiated at a temperature of about 500° F. This temperature is, of course, raised as the catalyst ages in order to maintain catalytic activity. In general, the run is terminated at an end-of-run temperature of about 675° F., at which time the catalyst may be reactivated by contact at elevated temperature with hydrogen gas, or regenerated by contact with oxygen-containing gas. Catalysts which can be used include those of the ZSM-5 type as set forth in U.S. Pat. Nos. 3,894,938, 4,137,148 and Re 28,398. These patents are incorporated herein by reference. The catalyst, particularly if it is of the ZSM-5 type, can have incorporated therein a hydrogen transfer functional component such as nickel, palladium, or platinum in a proportion of 0.05 to 5 weight percent based on the total weight of catalyst.

The product of the catalytic dewaxing step can be fractionated into liquid and gas portions by cooling to a prescribed temperature at an appropriate pressure. The liquid can then be subjected to the hydrotreating step. It is preferred, however, to subject the entire dewaxed product, to the hydrotreating step. In general, hydrotreating conditions include a temperature of 425° to 600° F., preferably 475° to 550° F.; a space velocity (LHSV) of 0.1 to 4.0 volumes of charge oil per volume of catalyst per hour, preferably 0.5 to 1 LHSV; a hydrogen partial pressure of 150-1500 psia preferably 200-500 psia with 500 to 5000 standard cubic feet of hydrogen per barrel of feed (SCF/B), preferably 1500 to 2500 SCF/B. It is preferred to conduct the hydrotreating step by contacting the dewaxed product with the hydrotreating catalyst in a fixed stationary bed.

The composition and use of the hydrotreating catalyst in the hydrotreating step is the feature of this invention. We have determined that incorporating a zeolite selected from the group consisting of ZSM-5, ZSM-11, ZSM-23, and ZSM-35 in the second-stage hydrotreating catalyst results in a further reduction of pour point without significantly impairing the hydrotreating function of the catalyst.

ZSM-5 is described in greater detail in U.S. Pat. Nos. 3,702,886 and Re 29,948. The entire description contained within those patents, particularly the X-ray diffraction pattern of therein disclosed ZSM-5, are incorporated herein by reference.

ZSM-11 is described in U.S. Pat. No. 3,706,979. That description, and in particular the X-ray diffraction pattern of said ZSM-11, is incorporated herein by reference.

ZSM-23 is described in U.S. Pat. No. 4,076,842. The entire content thereof, particularly the specification of the X-ray diffraction pattern of the disclosed zeolite, is incorporated herein by reference.

ZSM-35 is described in U.S. Pat. No. 4,016,245. The description of that zeolite, and particularly the X-ray diffraction pattern thereof, is incorporated herein by reference.

The original cations associated with each of the crystalline aluminosilicate zeolites utilized herein may be replaced by a wide variety of other cations according to techniques well known in the art. Typical replacing cations include hydrogen, ammonium and metal cations, including mixtures of the same. Of the replacing metallic cations, particular preference is given to cations of metals such as rare earth metals, manganese, calcium, as well as metals of Group IIB of the Periodic Table, e.g. zinc, and Group VIII of the Periodic Table, e.g. nickel, platinum and palladium.

Typical ion exchange techniques would be to contact the particular zeolite with a salt of the desired replacing cation. Although a wide variety of salts can be employed, particular preference is given to chlorides, nitrates and sulfates.

Representative ion exchange techniques are disclosed in a wide variety of patents including U.S. Pat. Nos. 3,140,249; 3,130,251; and 3,140,253.

Following contact with solution of the desired replacing cation, the zeolite is then preferably washed with water and dried at a temperature ranging from 150° F. to about 600° F. and thereafter calcined in air or other inert gas at temperatures ranging from about 500° F. to 1500° F. for periods of time ranging from 1 to 48 hours or more. It has been further found that catalyst of improved selectivity and other beneficial properties may be obtained by subjecting the zeolite to treatment with steam at elevated temperature ranging from 500° F. to 1200° F. and preferably 750° F. to 1000° F. The treatment may be accomplished in an atmosphere of 100% steam or an atmosphere consisting of steam and a gas which is substantially inert to the zeolites.

A similar treatment can be accomplished at lower temperatures and elevated pressure, e.g. 350°-700° F. at 10 to about 200 atmospheres.

Prior to use, the zeolites should be dehydrated at least partially. This can be done by heating to a temperature in the range of 200° to 1000° F. in an inert atmosphere, such as air, nitrogen, etc. and at atmospheric or subatmospheric pressures for between 1 and 48 hours. Dehydration can also be performed at lower temperatures merely by using a vacuum, but a longer time is required to obtain sufficient amount of dehydration.

The hydrogenating component utilized in the hydrotreating step of the process can be one or more of the metals ordinarily used for this purpose in the elemental, sulfide or oxide form such as tungsten, molybdenum, nickel, cobalt, or a noble metal such as platinum or palladium. Preferred catalysts are cobalt or nickel in the elemental, sulfide or oxide form each in combination with molybdenum in the elemental, sulfide or oxide form supported on a refractory material preferably a non acidic one such as alumina.

Although it is within the concept of this invention to use a mixture of the zeolite component and the hydrogenating component in which each component is contained in separate discrete particles forming a mixture of particles, it is preferred to combine the zeolite and the metal into one particle. Accordingly, a preferred method for preparing the catalyst is to blend the zeolite with a refractory inorganic oxide, preferably hydrated alumina, form the composite into extrudates, dry the extrudate and calcine it in an atmosphere such as nitrogen or air. The extrudate may then be exchanged with cations like ammonium and recalcined, prior to impregnation or exchange with hydrogenation type metals such as molybdenum, nickel and cobalt. Drying and calcining subsequent to impregnation completes the preparation.

The catalysts of this invention are typically prepared by extruding a mixture of about 40% or less of unexchanged zeolite (i.e., as crystallized, Na form) and alumina.

The extrudate is dried and then calcined in flowing $N_2$ for three hours at 1000° F. and then in air for three hours at 1000° F.

It is exchanged with $NH_4NO_3$ solution to obtain a product having low sodium content, dried, and recalcined in air for three hours at 1000° F. The extrudate is then impregnated with solutions containing salts of the desired hydrogenation metal components, dried and recalcined at 1000° F.

Generally the zeolite or mixture of zeolites in the finished dried composite will range from about 5 to 40 percent by weight and the amount of hydrogenative metal or metals (in elemental, sulfide, or oxide form) will range between about 0.05 and about 25 percent by weight of the catalyst composition.

EXAMPLES

The evaluation procedures described in the following examples were conducted in a batch, shaker bomb unit that has been described in Ind. Eng. Chem., Vol. 50, page 47 (1958). The unit consists of a cylindrical one-liter pressure vessel mounted at the end of a reciprocating piston. An engine drives the piston up and down 200 strokes per minute. While the bomb is shaken in this manner, it moves through the center of a stationary induction coil. The bomb serves as a susceptor, and its contents are heated inductively to reaction temperature in 2–3 minutes. At the end of a run, the reactor is cooled in 2–3 minutes using a water spray. A thermocouple is located in a central thermowell. The reactor is connected to a pressurized gas system through loops of flexible tubing; hydrogen is supplied during the reaction period to maintain pressure.

The catalysts described in Examples 2-7 were prepared as described above by mixing ZSM-5 zeolite of an average crystallite size of 0.05 microns with alumina in the ratios indicated in Examples 2-7. The composited mixtures were extruded, dried and calcined in accordance with the preparation procedure already outlined, exchanged with ammonium nitrate to low sodium content, dried and calcined. They were then impregnated with solutions of ammonium heptamolybdate and nickel chloride. The dried, calcined product from this step resulted in a catalyst containing 5 percent by weight of nickel oxide and 17 percent by weight of molybdenum trioxide and corresponds to the metal concentration of the catalysts in Examples 2-7. In Examples 2-4 the diameter of the catalyst was 1/32 inch. In Examples 5-7, the diameter was 1/16 inch.

EXAMPLE 1

Dewaxing Stage

Multiple runs were conducted with the raffinate from the furfural extraction of a heavy neutral oil having the following properties:

| API Gravity | 29.2 |
|---|---|
| Pour Point | 105° F. |
| Viscosity | |
| Kv at 130° F. | 38.72 centistokes |
| Kv at 210° F. | 9.26 centistokes |
| Boiling range | 769-937° F. (95% point) |
| Sulfur Content | 0.74 weight % |

In each run 88 grams of the raffinate were charged with 17.6 grams of a dewaxing catalyst into the shaker bomb. The reaction mixture was allowed to react in the presence of hydrogen for a period of 130 minutes at a pressure of 500 psig. and a temperature of 550° F. The catalyst was a composite of 35 percent alumina and 65 percent of a nickel exchanged ZSM-5 zeolite. The liquid product from these runs was combined and used as a charge stock for the following examples. Although this particular batch of product was not tested for pour point, bromine number and sulfur content, runs made under the same conditions with this same neutral oil provide a 20° F. pour point, a 1.4 bromine number, and a 0.95 weight percent sulfur content. There is no reason to think this batch of product would not have had equivalent properties. Example 1 simulates the first stage treatment of a waxy paraffinic stock corresponding to the processes described in U.S. Pat. Nos. 4,137,148 and 3,700,585.

Hydrotreating Stage

Examples 2 and 5 illustrate the present-art processes for hydrotreating after a catalytic dewaxing step, i.e. hydrotreating in the presence of catalyst that contains no zeolite. Examples 3, 4, 6 and 7 illustrate the process of the present invention.

In each of the following runs, 88-gram portions of the product from Example 1 were hydrotreated in the shaker bomb unit at 515° F., and 500 psig for 130 minutes in the presence of 17.6 grams of each of the catalysts described below.

EXAMPLE 2

The nickel-molybdenum catalyst of Example 2 was prepared on a support comprising 100% alumina and no zeolite.

The 650° F.+product had the following properties: 20° F. pour point; 0.1 bromine number; 95.2 viscosity index; and 0.44 weight percent sulfur.

EXAMPLE 3

The nickel-molybdenum catalyst of Example 3 was prepared on a support comprising 15 weight percent of ZSM-5 zeolite and 85 weight percent of alumina.

The 650° F.+product had the following properties: 10° F. pour point; 0.1 bromine number; 93.2 viscosity index and 0.49 weight percent sulfur.

Note that the pour point is 10° F. lower than that of the present-art process of Example 2, indicating a greater degree of dewaxing achieved in the process of this invention. The low bromine number illustrates that the improved dewaxing result is achieved without impairing the ability of the process to saturate olefins.

EXAMPLE 4

The nickel-molybdenum catalyst of Example 4 was prepared on a support comprising 15 weight percent of ZSM-5 zeolite and 85 weight percent of alumina. The support was treated in an atmosphere of 100% steam for 6 hours at 900° F. before impregnation with nickel and molybdenum.

The 650° F.+product had the following properties: 15° F. pour point; 0.3 bromine number; 93.0 viscosity index and 0.51 weight percent sulfur.

Note that the product pour point is 5° F. lower than that of the present-art process of Example 2, thus indicating a greater degree of dewaxing achieved in the concept process. The 0.3 bromine number is an indication of an acceptable level of olefin saturation.

EXAMPLE 5

The nickel-molybdenum catalyst of Example 5 was prepared on a support comprising 100% alumina and no zeolite. The support diameter was 1/16 inch, as were the catalysts of Example 6 and 7.

The 650° F.+product had the following properties: 25° F. pour point; 0.3 bromine number; 96.3 viscosity index and 0.63 weight percent sulfur.

This example illustrates present-art hydrotreating processes for comparison with Examples 6 and 7.

EXAMPLE 6

The nickel-molybdenum catalyst of Example 6 was prepared on a support comprising 30 weight percent of ZSM-5 zeolite and 70 weight percent alumina. The 650° F.+product properties were 10° F. pour point; 0.1 bromine number; 91.9 viscosity index and 0.49 weight percent sulfur. The pour point was 15° F. lower than that in the present-art process of Example 5, indicating again the greater degree of dewaxing achieved by the process of this invention. Also, the low bromine number of 0.1 indicates an excellent degree of saturation with the process of this invention.

EXAMPLE 7

The nickel-molybdenum catalyst of Example 7 was prepared on a support comprising 30 weight percent of ZSM-5 zeolite and 70 weight percent of alumina, that was steamed 6 hours at 900° F. prior to impregnation.

The 650° F.+product properties were 5° F. pour point; 0.5 bromine number; 92.0 viscosity index and 0.57 weight percent sulfur. Again, this example of the process of this invention shows a 20° F. lower pour point than that in Example 5, a substantial advantage in activity. Also, the 0.5 bromine number is well within acceptable limits of saturation.

What is claimed is:

1. A process for catalytically dewaxing and hydrotreating a waxy hydrocarbon fraction boiling within the approximate range of 400° to 1050° F. to provide a lubricating oil of high viscosity index which comprises:
   (a) contacting said fraction with a dewaxing catalyst under conditions sufficient to effect at least a partial dewaxing of said fraction; and
   (b) contacting the reaction product thereby obtained with hydrogen and a hydrotreating catalyst comprising one or more zeolites selected from the group consisting of ZSM-5, ZSM-11, ZSM-23, and ZSM-35, blended with a refractory inorganic oxide to form an extrudate, said extrudate having a metal hydrogenation component present therein in a concentration of metal in elemental, oxide, or sulfide form of between about 0.05 and about 25 percent by weight and a concentration of zeolite in said extrudate of between about 5 and about 40 percent by weight.

2. The process of claim 1 wherein said contacting of reaction product is effected at a temperature between about 425° and about 600° F., a hydrogen partial pressure between about 150 and about 1500 psig, an LHSV of between about 0.1 and about 4.0 and between about 500 and about 5000 standard cubic feet of hydrogen per barrel of reaction product.

3. The process of claim 1 wherein said hydrogenation component includes one or more metal components selected from the group consisting of tungsten, molybdenum, nickel, cobalt, platinum and palladium or mixtures and compounds thereof.

4. The process of claim 1 wherein said hydrogenation component comprises molybdenum and either cobalt or nickel in the elemental or oxide or sulfide form.

5. The process of claim 1 wherein said inorganic oxide is alumina.

6. The process of claim 1 wherein said zeolite is ZSM-5.

7. The process of claim 1 wherein said zeolite is ZSM-11.

8. The process of claim 1 wherein said zeolite is ZSM-23.

9. The process of claim 1 wherein said zeolite is ZSM-35.

10. The process of claim 1 wherein said waxy hydrocarbon fraction is a fraction boiling within the approximate range of 600° to 1050° F.

* * * * *